United States Patent [19]

Moss

[11] Patent Number: 5,396,802
[45] Date of Patent: Mar. 14, 1995

[54] DIFFERENTIAL PRESSURE TRANSDUCER UTILIZING A VARIABLE FERROFLUID KEEPER AS AN ACTIVE MAGNETIC CIRCUIT ELEMENT

[75] Inventor: Robert A. Moss, Buffalo, N.Y.

[73] Assignee: Viatran Corporation, Grand Island, N.Y.

[21] Appl. No.: 112,563

[22] Filed: Aug. 26, 1993

[51] Int. Cl.⁶ .......................... G01L 9/10; G01L 9/14; H01F 21/02
[52] U.S. Cl. ........................................ 73/722; 336/30
[58] Field of Search .................... 73/706, 722, 728; 336/30, 130, 132

[56] References Cited

U.S. PATENT DOCUMENTS

| | | |
|---|---|---|
| 2,460,076 | 1/1949 | Emerson . |
| 2,581,359 | 1/1952 | Clark . |
| 2,932,972 | 4/1960 | Cosby et al. . |
| 3,047,022 | 7/1962 | Aldinger ............................. 73/722 |
| 3,258,966 | 7/1966 | St. Coeur . |
| 3,485,104 | 12/1969 | Sanford ............................. 73/722 |
| 3,492,872 | 2/1970 | Caspar et al. ..................... 73/722 |
| 3,646,814 | 3/1972 | Christoph et al. . |
| 3,834,239 | 9/1974 | King ................................. 73/722 |
| 3,956,938 | 5/1976 | Carrico ............................. 73/728 |
| 3,990,310 | 11/1976 | Greer et al. . |
| 4,170,498 | 10/1979 | Jost et al. . |
| 4,172,387 | 10/1979 | Ezekiel et al. . |
| 4,462,259 | 7/1984 | Stoltman et al. . |
| 4,507,972 | 4/1985 | Morita . |
| 4,538,465 | 9/1985 | Bianchi et al. . |
| 4,593,703 | 6/1986 | Cosman . |
| 4,606,229 | 8/1986 | Spence . |
| 4,665,753 | 5/1987 | Bertrand ........................... 336/30 |
| 4,788,867 | 12/1988 | Kishel .............................. 73/706 |

Primary Examiner—Richard E. Chilcot, Jr.
Assistant Examiner—William L. Oen
Attorney, Agent, or Firm—Ratner & Prestia

[57] ABSTRACT

A differential pressure transducer for measuring external pressures is disclosed. The pressure transducer uses a ferrofluid contained in two interconnecting chambers, enclosed by two non-magnetic spring diaphragms. In this embodiment, two independent inductance series circuits, each comprising a bar magnet, Hall effect sensor and an iron pole piece, measure variations in the volume of ferrofluid in each of the interconnecting chambers. Changes in pressure displace the non-magnetic spring diaphragms causing the volume in each interconnecting chamber to change in a differential manner. The flux path in the series magnetic circuit is distorted by changes in the volume of the ferrofluid, causing changes in the flux density at the sensing area of the Hall effect sensor, this sensor producing an electrical signal proportional to the flux change. The differential output of the two Hall Effect sensors contained in the two series magnetic circuits produce an electrical signal proportional to the applied differential pressure.

18 Claims, 7 Drawing Sheets

$P_1 = P_2$

DIFFERENTIAL PRESSURE TRANSDUCER UTILIZING A VARIABLE FERROFLUID KEEPER AS AN ACTIVE MAGNETIC CIRCUIT ELEMENT

FIELD OF THE INVENTION

This invention relates generally to pressure measurement devices. More specifically, it relates to differential pressure transducers which convert measurements of pressure changes into electrical signals.

BACKGROUND OF THE INVENTION

Pressure transducers provide pressure measurements for many applications from scientific experiments to control of industrial systems and machines. In these applications, pressure changes need to be measured and converted into electrical signals representing the pressure changes. In some instances, a differential pressure transducer is used to detect pressure differences between two applied bias pressures. In many cases the media being measured is corrosive or conductive and requires a "wet/wet" differential pressure transducer. This type of transducer has two pressure ports which may be exposed to the process media without damage to the sensitive pressure measuring apparatus. The common technologies for measuring this phenomenon are capacitance or reluctance devices requiring complex alternating current electronics and multiple passive isolation diaphragms. Bonded foil strain gage devices are also commonly used with passive isolation diaphragms, but are not practical for the low differential pressure ranges common in these applications.

U.S. Pat. No. 4,462,259 describes a manometer type differential pressure gauge using a column of ferrofluid to act as the dielectric medium between two plates on either side of the column, forming a capacitor. The length of the ferrofluid in the column is dependent upon an applied pressure differential, so that the capacitance in the capacitor thus formed is dependent upon the applied pressure.

A magnetic field is used to act on the magnetic fluid to bias the slug of fluid toward the reference position. The magnetic field creates an additional force which adds to the gravitational forces acting on the magnetic field, a given column length of the magnetic liquid can represent a pressure differential which is larger than that obtained absent the application of the magnetic field.

This design, however, can only be used with clean gases, as the ferrofluid is exposed to the process medium. If high over-pressure situations develop, the ferrofluid could be expelled from the manometer tube. Devices made according to this design also require complex AC electronics to convert the differential column height of the ferrofluid to a useable electric signal.

U.S. Pat. No. 4,788,867 describes a pressure transducer having a permanent magnetic "piston," suspended in a tube by a body of magnetic fluid. Pressure differentials applied to the tube cause the piston to move within the tube. A linear variable differential transformer (LVDT) measure the displacement of the piston. A second pair of cavities separate the magnetic fluid from the process media and provide over-pressure protection. The ferrofluid property is thus used to float a ferromagnetic material, acting as a frictionless seal for the magnetic piston. This moving piston has substantial mass and is therefore sensitive to gravitational effects.

BRIEF DESCRIPTION OF THE DRAWINGS

The following serve as non-limiting examples of the present invention in which.

SUMMARY OF THE INVENTION

The present invention provides a simple differential pressure measuring instrument for corrosive, wet/wet applications. The invention also provides high single sided overload and basepressure capabilities.

The present invention further provides a high level d.c. signal using only two Hall effect sensors. No other discrete electronic components are required.

The present invention further provides high voltage isolation from case ground due to the high breakdown voltage of the Hall effect sensors. Furthermore, the sensors are physically isolated from the ferrofluid and the process media, such that failure of the active diaphragms will not permit the process media to make contact with the electrical system. These characteristics make this device ideally suited for operating in hazardous locations.

The present invention provides a simple construction due to the use of a ferrofluid. This ferrofluid acts as a pressure transfer media, a variable reluctance mechanism and a spring element due to ferrohydrodynamic effects.

The present invention uses a ferrofluid as a variable reluctance mechanism. Ferrofluids exhibit superparamagnetic behavior when exposed to magnetic fields. Superparamagnetic fluids do not exhibit hysteresis in changing magnetic fields, nor do they agglomerate when exposed to a steady state magnetic field due to Brownian motion of the magnetic particles. Both of these characteristics are common to simple ferromagnetic fluids that do not exhibit superparamagnetism. Hysteresis and agglomeration are detrimental characteristics for a pressure measuring instrument.

The sensing system of the present invention is a series magnetic circuit comprising a permanent magnet in series with a Hall effect sensor, in series with the variable volume of ferrofluid. Hall effect sensors are devices which provide a d.c. voltage proportional to the applied magnetic field strength.

The present invention requires large displacement of the force collecting spring diaphragms relative to other techniques used in the measurement of differential pressure. The diaphragms in the preferred embodiment are designed to displace 0.020" over the intended pressure range. This is in contrast to 0.00001" deflection for silicon sensor technology and up to 0.004" deflection for capacitance technology. The large deflection of the present invention results in a sensor which does not require high tolerance assembly techniques. Minor variances in the assembly of these sensors will not have significant effects on overall performance characteristics.

DETAILED DESCRIPTION

Figure 1:
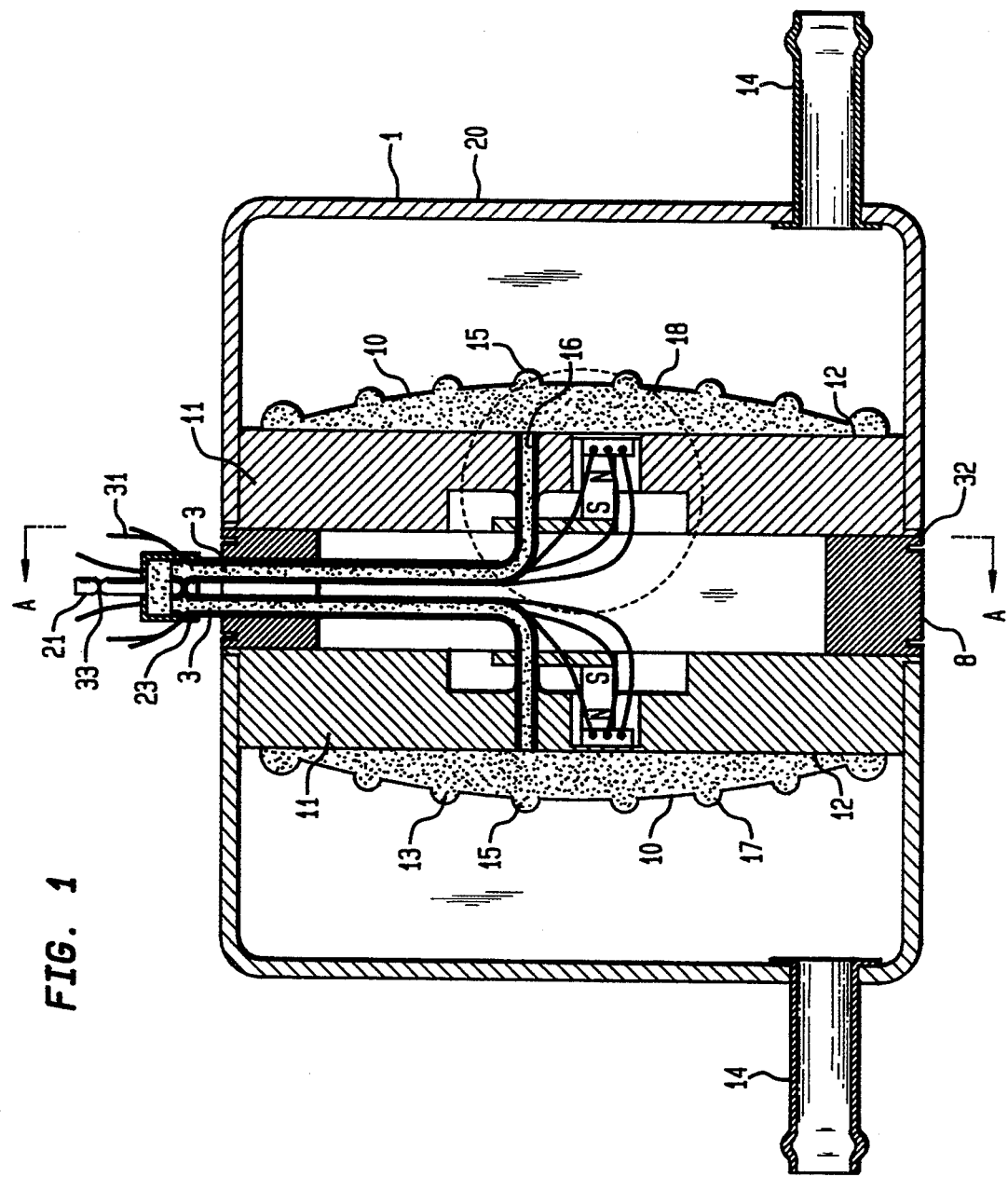
FIG. 1 is a cut-away view of an exemplary differential pressure transducer according to the present invention.

There is shown in FIG. 1 an exemplary embodiment of a differential pressure transducer 20 constructed in accordance with the present invention. Differential pressure transducer 20 comprises a pair of end caps 1 and a spacer 8, with both end caps 1 and spacer 8 made of a ferromagnetic material having good corrosion resistance. This material must be compatible for welding 35 with the material of the bodies 11. End caps 1 provide support for pressure ports 14, as well as a means for shielding against magnetic noise, external to a differential pressure transducer 20. Pressure ports 14 in differential pressure transducer 20 should be located to provide optimum isolation of the magnetic circuits 18 from factors such as external magnetic noise and effects from ferromagnetic components such as interconnecting pipes and tubes.

A single volume of ferrofluid 13 is contained in reservoirs 15. Reservoirs 15 serve as first and second containment means uses for containing the ferrofluid. Each reservoir 15 thus divides the single volume of ferrofluid 15 into two sub volumes. Each of the two reservoirs 15 are formed by their respective spring diaphragm 10 and side 12 of bodies 11. A connecting passage 16 is comprised of two ferromagnetic fill tubes 3, a fill coupling 23. Connecting passage 16 serves as interconnection means between reservoirs 15 and allows the flow of the ferromagnetic fluid from one chamber 15 into the other, depending upon the pressures being asserted against diaphragm 10 through pressure ports 14 of differential pressure transducer 20. A fill tube 21 is used for filling both tubes 3 and connecting passage 16 with ferrofluid 13. Ferromagnetic fill tubes 3 also act as magnetic circuit elements in the magnetic sensing circuit.

In the exemplary embodiment shown in FIG. 1, tubes 3 are solder connected via silver solder to fill coupling 23, which allows for filling, under vacuum, of the two reservoirs 15 with the ferrofluid and allows flow from one reservoir 15 to the other. Those skilled in the art will understand other methods of connecting tube 3 to fill coupling 23. A fill tube 21 facilitates filling and provides a surface appropriate for a sealing method such as ultrasonic welding 33 which serves as a sealing means for sealing fill tube 21. More than one fill tube could be used for reservoirs 15 with ferromagnetic fluid 13. The incompressibility of the ferrofluid and the resilience of the fill system enable the spring diaphragms 10 to withstand high base pressures relative to the differential pressures applied.

The change in the reluctance path is dependent upon the displacement of the volume of ferrofluid 13. This displacement is dependent upon the deformation displacement of spring diaphragms 10. The displacement of spring diaphragms 10 in the exemplary embodiment required is large relative to conventional transducer techniques. Spring diaphragms 10 are designed for large displacement using semicircular convolutes 17. Diaphragms 10 are formed into configurations shown so as to collapse against outside wall 12 of bodies 11 in a continuous, uniform manner, such that semicircular convolutes 17 retain their shape. In this collapsed position, semicircular convolutes 17 are structurally resistant to yielding from the effects of high overload pressures. Spring diaphragms 10 should be made of a nonmagnetic material with a high yield strength. Inconel X750 TM is a high strength, nickel superalloy which can be heat-treated and has low permeability. Heat-treating also tends to reduce residual stress caused by forming, which improves the dimensional stability of the diaphragms. Other suitable materials for the construction of spring diaphragms 10 will be understood by those skilled in the art.

As pressure is applied through one of the pressure ports 14, the corresponding spring diaphragm 10 is compressed, forcing ferrofluid 13 through connecting passage 16 from the corresponding reservoir 15 into the opposite reservoir 15, thereby expanding the opposite spring diaphragm 10. This change in distribution of ferrofluid 13 is detected and measured by magnetic circuit 18 which contains the sensing means of the present invention.

Figure 2:
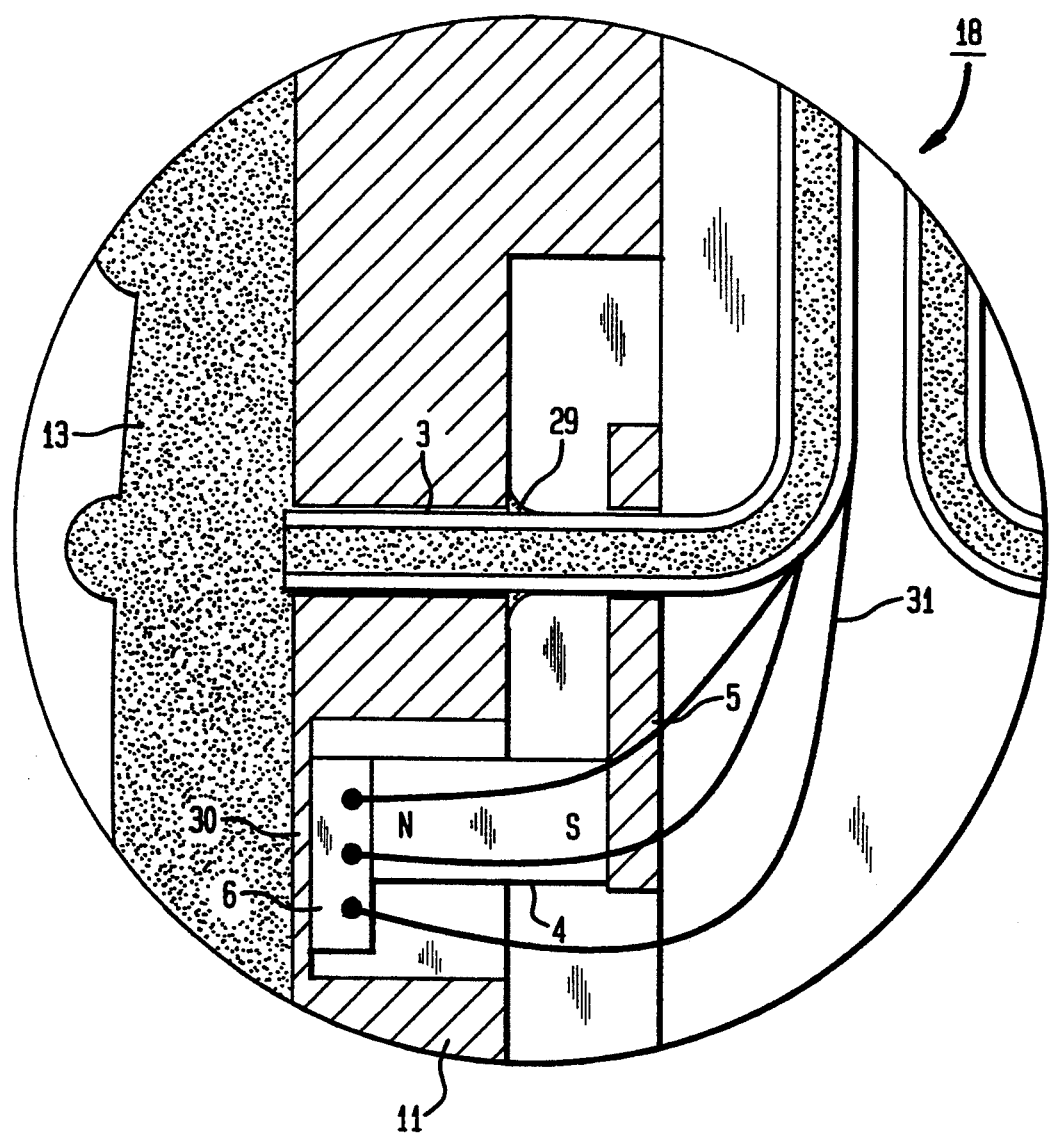
FIG. 2 is a cut-away view of a magnetic circuit used in the differential pressure transducer shown in FIG. 1.

FIG. 2 shows a detailed view of the series magnetic circuit 18 of FIG. 1. A similar circuit 18 is used on the other side of differential pressure transducer 20 in the exemplary embodiment shown in FIG. 1. Magnetic circuit 18 is made up of a permanent magnet 4, a linear Hall Effect sensor 6, a non-magnetic gap 30, a variable quantity of ferrofluid 13, a ferromagnetic tube 3 and a ferromagnetic keeper 5. This closed series magnetic circuit 18 comprises the magnetic sensor of the invention (with magnet 4 serving as the magnet means). One sensor assembly (magnetic sensor 18) is oriented with each diaphragm. As pressure is applied, one volume of ferrofluid increases while the other decreases, creating a differential effect. This arrangement reduces errors due to nonlinearity, temperature and other common mode errors. Fill tubes 3 are brazed to body 11 at braze 29. Other methods of attachment will be understood by those skilled in the art. All other components of the series magnetic circuit are bonded together. Wires 31 from Hall Effect sensors 6 are exited through spacer 8 with ferromagnetic tubes 3 (see FIG. 1).

There is shown in FIG. 2 a cut away magnified view of magnetic circuit 18. Magnetic circuit 18, shown in FIG. 2, includes a soft steel fill tube 3 and keeper 5. Magnet 4 is made of Alnico #8, a highly stable permanent magnetic material in the exemplary embodiment. Other suitable permanent magnetic materials will be understood by those skilled in the art. The magnetic saturation of ferrofluid 13 of the present embodiment is 600 Gauss. Hall Effect sensor 6 is a Sprague part #UGN3503U in the exemplary embodiment.

The Hall Effect sensor 6 is oriented outside the center of the circuit. This orientation has been found to be the location where flux densities varied the greatest with given changes in ferrofluid depth in this particular circuit design. Other placements of Hall Effect sensor 6 are possible, depending upon specific applications and/or design requirements. Electromagnetic Finite Element Analysis is suggested to optimize the performance of each configuration. Parameters effecting performance include: magnet size and shape, magnet material BH curve, Hall Effect sensor operating range, ferrofluid BH curve and Ms max., air gap, change in ferrofluid depth, pole piece BH curve and geometry of the series circuit. Finite element analysis technique can also be used to analyze the nonlinearity and temperature performance effects. Many specialized ferromagnetic materials are available which change magnetic properties with temperature. These materials can be selected to compensate for changes in sensor output due to temperature variances. These materials will be familiar to those skilled in the art.

Magnetic circuit 18 must be carefully designed to take advantage of the limited susceptibility of ferrofluid 13 and operate linear Hall Effect sensors 6 within the effective flux density range. A design objective is to achieve the largest change in flux density in the series magnetic circuit 18 for a given change in ferrofluid volume, with a small bias flux density, while maintaining reasonable temperature stability. Large bias flux densities cause the series magnetic circuit 18 to be insensitive, but small bias flux densities do not saturate ferrofluid 13 adequately to reduce susceptibility sensitivity to temperature changes. The ferrohydrodynamic properties of ferrofluid 13 being acted on by a magnetic field will also be minimized by keeping the bias flux density small.

The relative susceptibility of the volume of ferrofluid 13 versus the volume of air (or process fluid) in the series induction path, determines the output capability of the transducer. The susceptibility of ferrofluid 13 is a function of the applied magnetic field and the fluid temperature.

Assuming a parallel, linear magnetic field (H) is applied to a gap filled with a mixture of ferrofluid and air, the magnetic induction (B) in the gap can be described by the following equation:

$$B = H + q * (Ms * (1 - (k/m) * (T/H)))$$

$:q \leq = 1.$
$:(k/m) * (T/H) \leq \leq 1.$ where
 q: the fraction of ferrofluid area to the total area of the inductance path
 Ms: magnetic saturation of the ferrofluid
 m: magnetic dipole moment of the particles
 T: temperature in Kelvin
 k: Boltzmann's constant
 H: applied magnetic field
 B: magnetic induction in the gap The above equation is derived and simplified from equations taken from "Ferrohydrodynamics" by Rosensweig, Cambridge University Press, which is incorporated herein by reference. It describes the macro characteristics of ferrofluid acted on by a linear field. Ms and m are constants of a given ferrofluid. When designing series magnetic circuit 18, the objective is to select H to maximize variations in B due to q and minimize variations in B due to changes in T. The exemplary embodiment exposes the ferrofluid to a gradient magnetic field, so an average optimal H should be considered.

The present invention allows for conversion of differential pressures into electrical signals as a integral part of the design. Hall Effect sensors 6 will output an electrical signal proportional to the change in flux density which is, in turn, proportional to the pressure differential between two pressures applied to corresponding pressure ports 14.

Further, the mass of ferrofluid 13 volume used is small relative to the spring force of spring diaphragms 10, thus effects of inclination are minimal. Gravitational effects acting on the small mass of ferrofluid 13 are inconsequential relative to the reaction forces of spring diaphragms 10. The body forces due to the magnetic field acting on the volume of ferrofluid 13 combine with the spring forces to maintain ferrofluid 13 in a reference position.

The present invention also contains no moving parts other than the deformation displacement of spring diaphragms 10. Induction imbalances occur due to the flow of ferrofluid 13. Ferrofluid 13 serves as a measurand, pressure transfer media, and stabilizing agent to create an efficient design.

Figure 3:
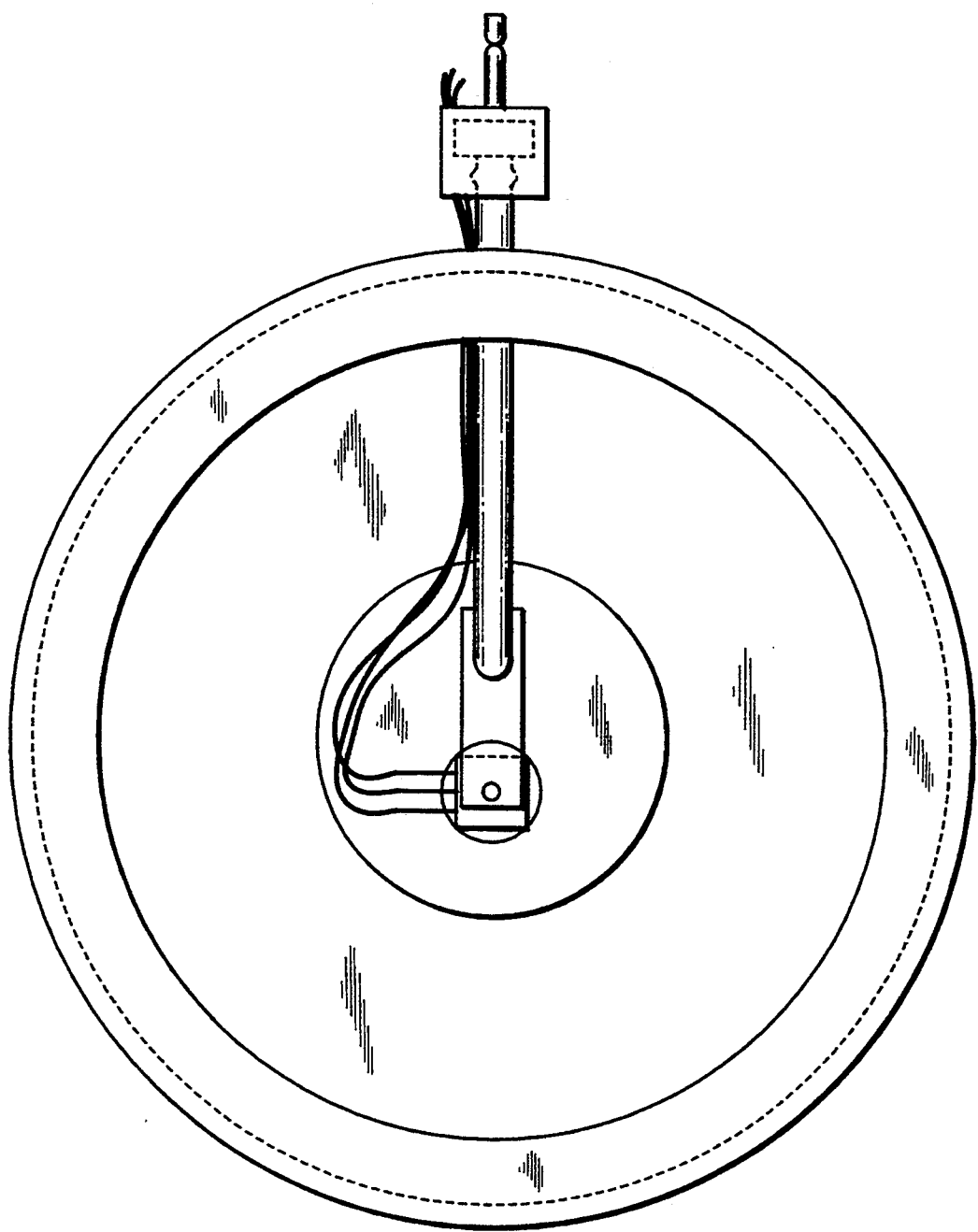
FIG. 3 is a section A—A of the differential pressure transducer shown in FIG. 1.

FIG. 3 is a sectional view A—A of differential pressure transducer 20 shown in FIG. 1. Other shapes and dimensions can be used depending upon the application for which a differential pressure transducer 20 is being used.

Figure 4:
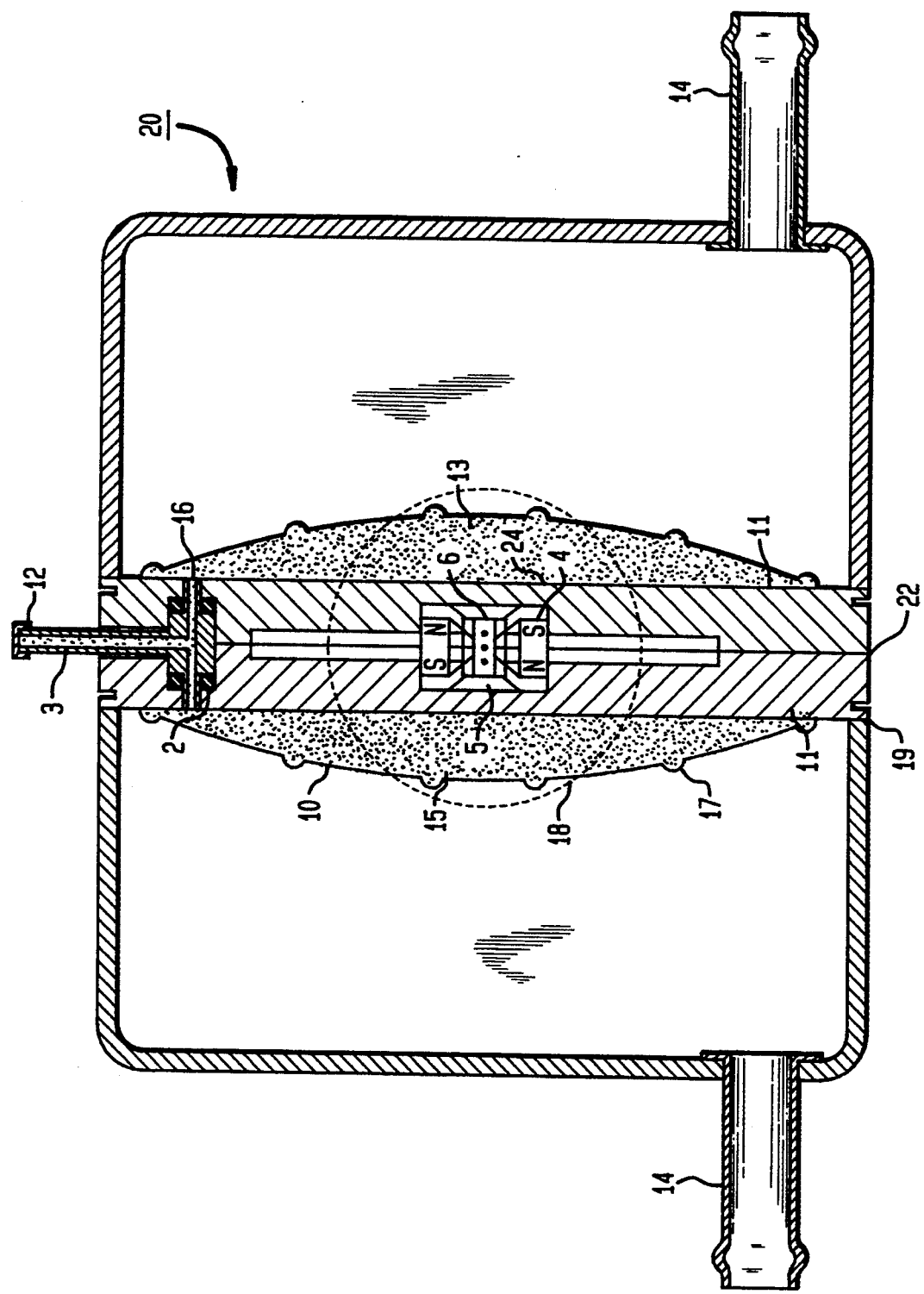
FIG. 4 is an alternate embodiment of a differential pressure transducer of the present invention.

There is shown in FIG. 4 an additional embodiment of differential pressure transducer 20. In this embodiment, fill tube 3 is a single fill tube sealed with an end cap 12. Connecting passage 16 connects reservoirs 15, without the U-shaped path of fill tubes 3 shown in FIG. 1.

Bodies 11 are connected to each other by a weld 22, without the need for spacer 8 shown in FIG. 1. When differential pressure is applied to pressure ports 14, ferrofluid 13 can flow freely between reservoirs 15 through connecting passage 16, depending on the size of the pressure differential.

Figure 5:
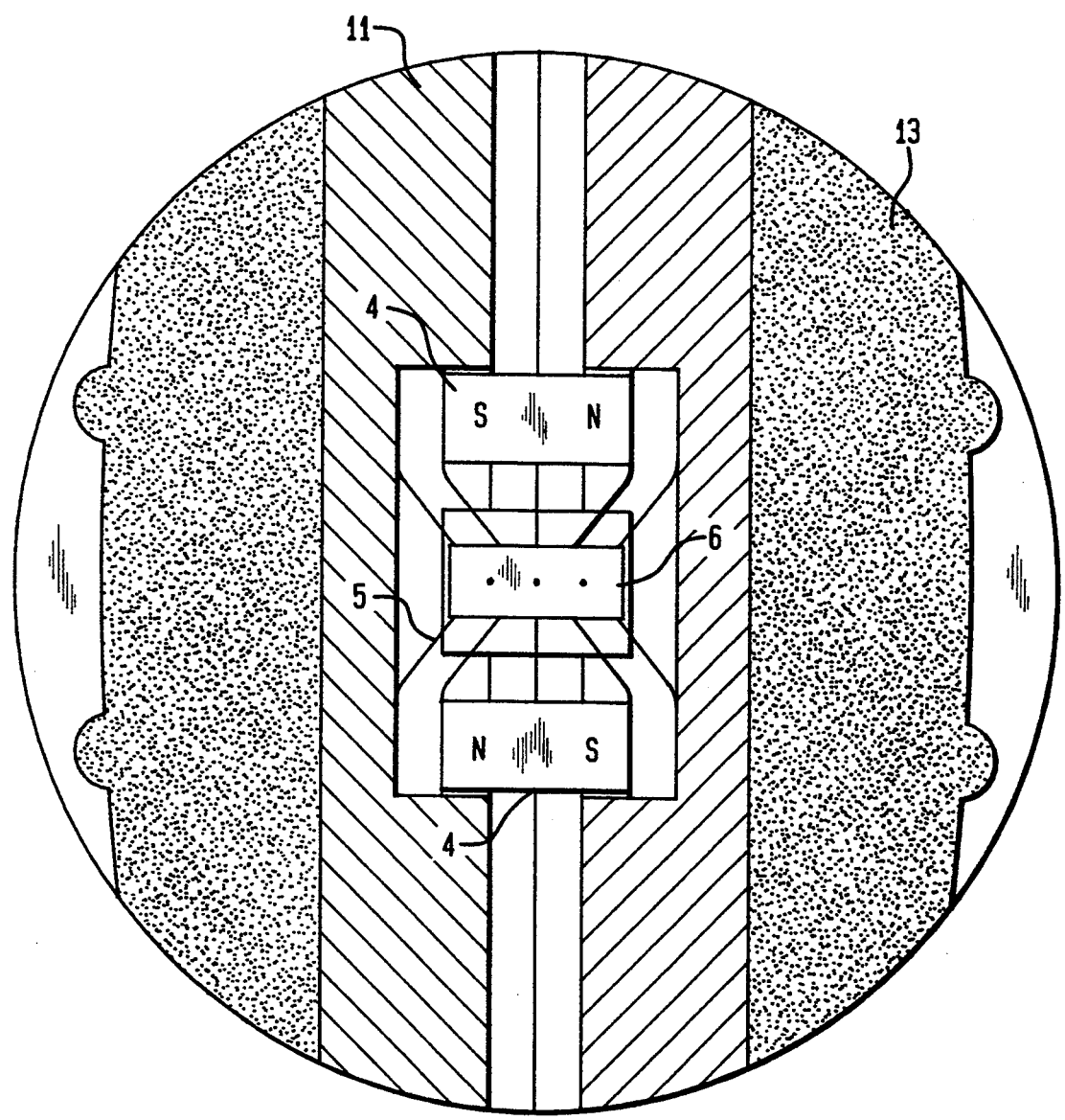
FIG. 5 is a cut-away view of the magnetic circuit of the differential pressure transducer shown in FIG. 4.

FIG. 5 shows a cut-away magnified view of magnetic circuit 18 of the embodiment shown in FIG. 4. Magnetic circuit 18 of this embodiment shows a permanent magnetic bridge 5 comprised of two magnets affixed in opposing directions. This arrangement reduces errors due to nonlinearity, temperature effects and also provides a true differential signal. Also, common mode errors are reduced.

Permanent magnetic bridge 5 is designed to use a full applicability of Hall Effect sensor 6 by creating a null flux density condition at Hall Effect sensor 6 when an equal induction is applied to both sides of permanent magnetic bridge 5. Using high energy permanent magnets 4, a suitable sensitive permanent magnetic bridge can be realized.

Referring back to FIG. 4, wires 31 (not shown) from Hall Effect sensor 6 are led out of differential pressure transducer 20 with fill tube 3.

Figure 6:
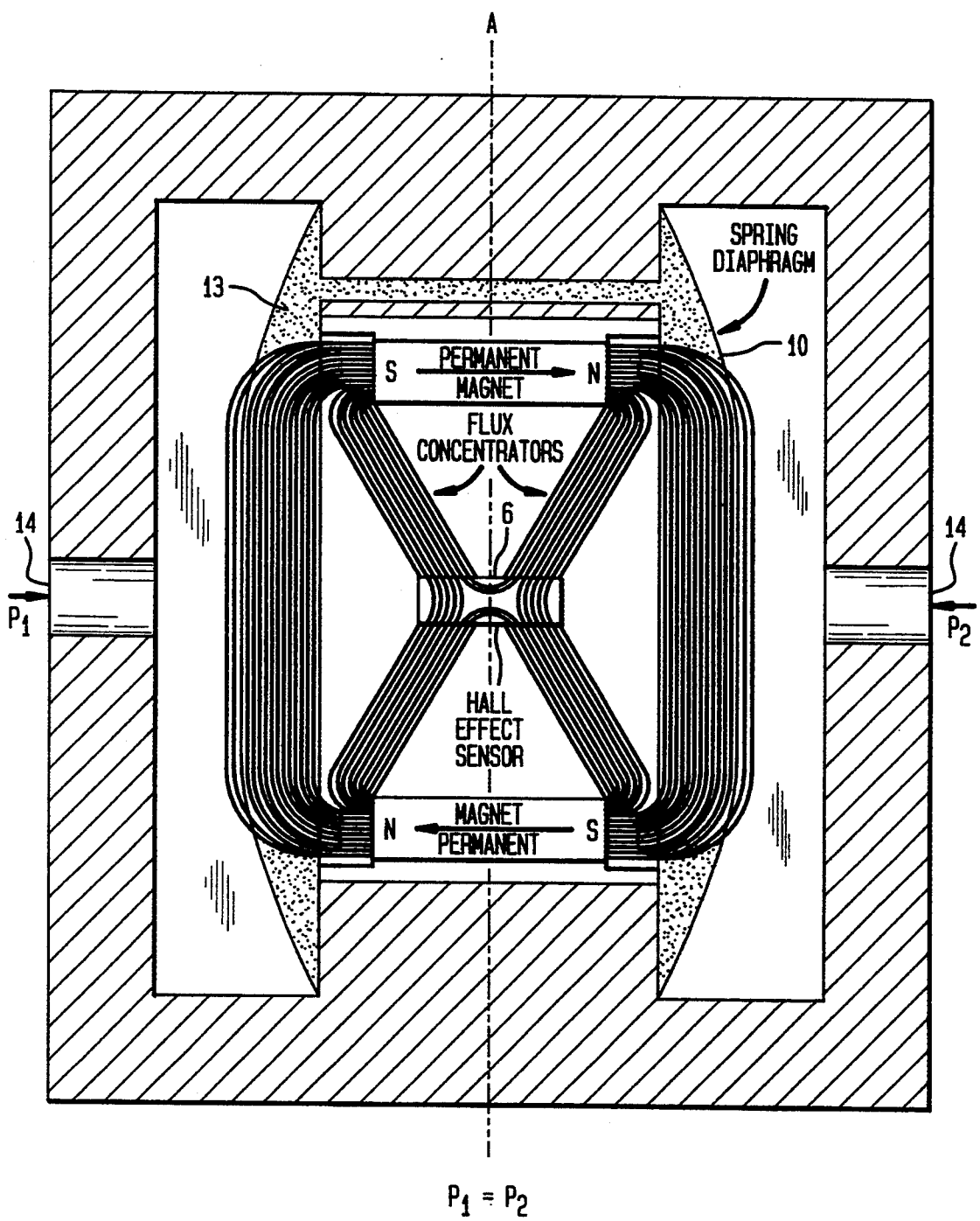
FIG. 6 is an illustration of the flux density in an exemplary embodiment of the present invention where the differential pressure is zero.
Figure 7:
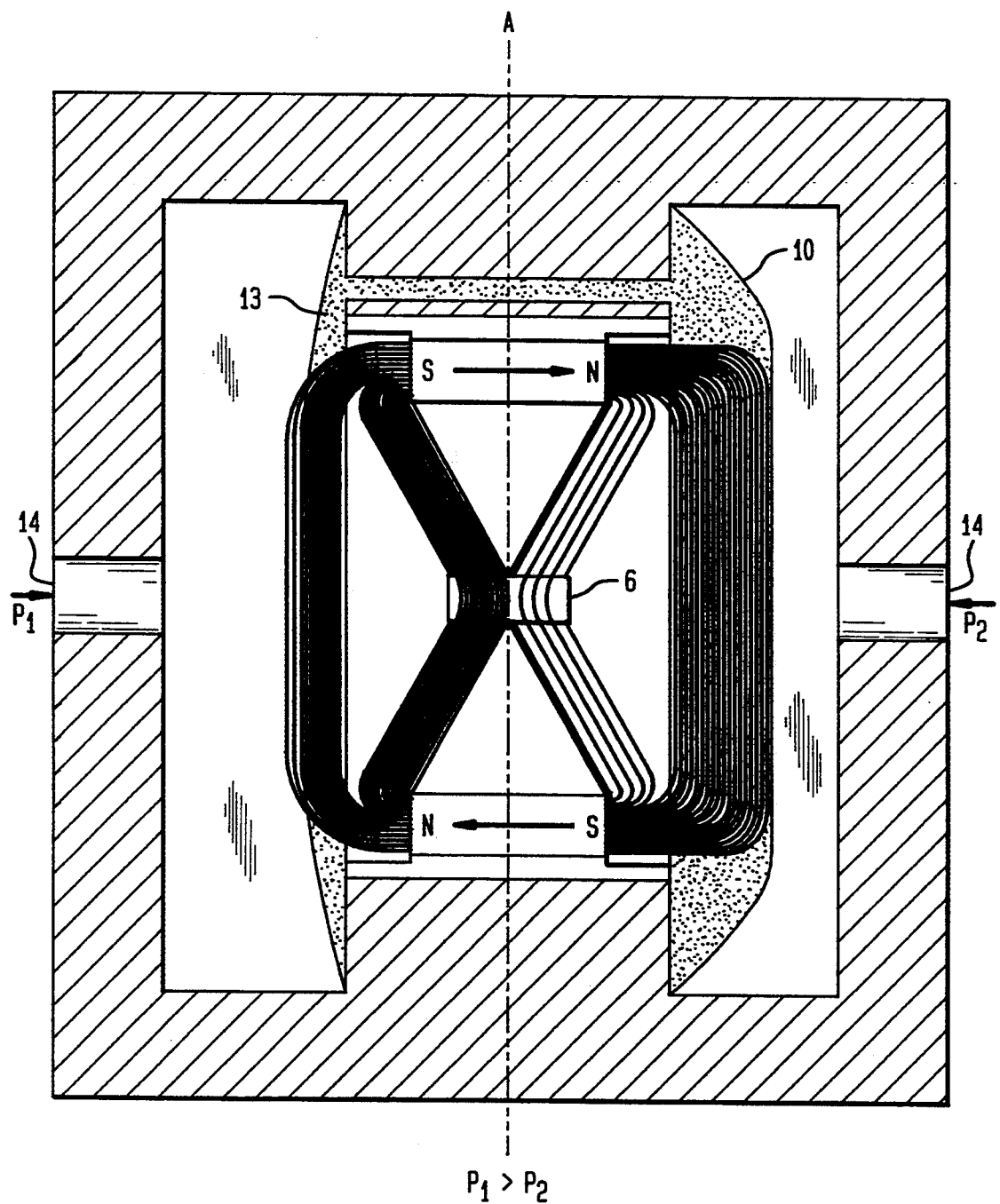
FIG. 7 is an illustration of the change in flux density in an exemplary embodiment of the present invention where a pressure P1 is greater than a pressure P2.

FIGS. 6 and 7 show a diagram of the distribution of the reluctance path of ferrofluid and that of the pole pieces (flux concentrators). FIG. 6 shows a case where pressure P1 is equal to a pressure P2. As can be seen, pressure P1 and pressure P2 are applied to their respective pressure ports 14. The reluctance path as shown by the dotted lines is evenly distributed on either side of reference line A. In FIG. 7, however, pressure P1 is greater than pressure P2. Diaphragms 10 displace until an equilibrium position is reached. The volume of ferrofluids 13 on the P1 side of reference line A is reduced, causing the flux density through the pole pieces 5 on the P1 side to increase. The opposite situation occurs on the P2 side of reference line A as the flux density through the respective pole pieces decreases. FIG. 7 illustrates the shifting of the flux pattern at the center of the permanent magnetic bridge such that the magnetic field strength is increased at the center of Hall Effect sensor 6, producing a proportional electrical signal.

The present invention has been described in terms of exemplary embodiments. It is contemplated however that it may be practiced with modifications, some of which are outlined above, within the scope of the appended claims.

What is claimed:
1. A differential pressure transducer for measuring external pressures comprising:
 a. first and second containment means for containing a ferrofluid, said first and second containment means responsive to changes in pressure applied to said first and second containment means;
 b. a ferrofluid distributed within each of said first and second containment means;
 c. interconnection means between said first and second containment means for allowing flow of said ferrofluid in response to changes in pressure applied to said first and second containment means;
 d. magnet means in magnetic contact with said ferrofluid for producing a magnetic field;
 e. sensing means for determining changes in the flux density of said magnetic field in response to changes in ferrofluid distribution caused by pressure applied to said first and second containment means.

2. The pressure transducer of claim 1 further comprising a nonmagnetic body member which contains said interconnection means, said magnet means and said sensing means.

3. The pressure transducer of claim 2 wherein said nonmagnetic body member further comprises a filling means for filling said first and second containment means with said ferrofluid.

4. The pressure transducer of claim 3 wherein said filling means comprises at least one fill tube and at least one sealing means for sealing said at least one fill tube against an escape of ferrofluid from said fill tube.

5. The pressure transducer of claim 2 further comprising shielding means for protecting said sensing means from magnetic signals external to said pressure transducer.

6. The pressure transducer of claim 5 wherein said shielding means comprises:
 a. pressure ports for transmitting external pressures to be measured to said first and second containment means; and
 b. at least one end cap enclosing both said nonmagnetic body member and said first and second containment means, said end cap fitted to said pressure ports.

7. The pressure transducer of claim 6 wherein said shielding means is made of corrosion resistant ferromagnetic material.

8. The pressure transducer of claim 2 wherein said first and second containment means are comprised of first and second opposing diaphragms, attached to opposite sides of said nonmagnetic body member, said first diaphragm adapted to compress towards said nonmagnetic body member when an external pressure is applied to said first diaphragm, said compression of said first diaphragm producing a transfer of ferrofluid contained in said first containment means through said interconnection means and into said second containment means, increasing the volume of ferrofluid in said second containment means, and producing a corresponding extension of said second diaphragm.

9. The pressure transducer of claim 8 wherein said diaphragms are made of a nonmagnetic material with a high yield strength.

10. The pressure transducer of claim 9 wherein said diaphragms are made of Inconel X750.

11. The pressure transducer of claim 2 wherein said magnet means are comprised of at least one magnetic assembly having a permanent magnet connected to a ferromagnetic keeper connected to a ferromagnetic flow tube, creating a series magnetic circuit with each of said first and second volumes of ferrofluid.

12. The pressure transducer of claim 11 wherein said sensing means comprises at least one Hall Effect sensor having a measurement range bounded by a minimum and maximum value adapted to produce a signal corresponding to a change in flux density resulting from the movement of said ferrofluid from said first containment means to said second containment means.

13. The pressure transducer of claim 12, wherein said at least one Hall Effect sensor is positioned where the flux density at the center of said Hall effect sensor is biased toward the midpoint of the maximum value of said Hall Effect sensor when said first and second containment means contain substantially equal amounts of ferrofluid.

14. The pressure transducer of claim 12, wherein said at least one Hall Effect sensor is positioned where the flux density at the center of said Hall Effect sensor is biased toward the midpoint of the maximum value of said at least one Hall Effect sensor at initial condition, prior to the application of an external pressure to said first and second containment means.

15. The pressure transducer of claim 2 wherein said ferrofluid has a high magnetic saturation.

16. The pressure transducer of claim 15 wherein said ferrofluid has a magnetic saturation of 600 Gauss.

17. The pressure transducer of claim 15 wherein said ferrofluid has a low viscosity.

18. A differential pressure transducer comprising:
 a. a body member having at least a first and a second outside wall;
 b. first and second magnetic assemblies located within said body member, each of said magnetic assemblies comprised of a permanent magnet, magnetic keeper and magnetic fill tubes, said permanent magnets producing a magnetic field having a flux density;
 c. first and second nonmagnetic, spring diaphragms, each capable of displacement by an external pressure;
 d. first and second reservoirs formed by said first and second spring diaphragms and said first and second outside walls, respectively;
 e. a ferrofluid contained within said first and second reservoirs and in magnetic contact with said magnetic assemblies;
 f. a passage connecting said first and second reservoirs allowing said ferrofluid to flow between said first and second reservoirs in relation to said displacement of said first and second diaphragms by an external pressure; and
 g. first and second Hall Effect sensors located within said body member and enclosed by said magnetic assemblies, said Hall Effect sensors adapted to produce electrical signals corresponding to changes in said flux density resulting from the flow of ferrofluid when said first and second diaphragms are displaced by an external pressure.

* * * * *